H. L. WEED.
CYLINDER FORMING PROCESS.
APPLICATION FILED APR. 4, 1918.

1,348,674.

Patented Aug. 3, 1920.

Inventor
Howard L. Weed,
By Pagelsen & Spencer
Attorneys.

UNITED STATES PATENT OFFICE.

HOWARD L. WEED, OF DETROIT, MICHIGAN, ASSIGNOR TO WEED DIFFERENTIAL-ROTARY MOTOR COMPANY, OF DETROIT, MICHIGAN, A CORPORATION OF SOUTH DAKOTA.

CYLINDER-FORMING PROCESS.

1,348,674.   Specification of Letters Patent.   Patented Aug. 3, 1920.

Original application filed May 11, 1917, Serial No. 167,994. Divided and this application filed April 4, 1918. Serial No. 226,606.

*To all whom it may concern:*

Be it known that I, HOWARD L. WEED, a citizen of the United States, and residing at Detroit, in the county of Wayne and State of Michigan, have invented a new and Improved Cylinder-Forming Process, of which the following is a specification.

This application is a division of my application for patent on cylinder forming machines, Serial Number 167994, filed May 11, 1917.

In forming the cylinders of rotary engines and other devices that include an annular cylinder of circular cross-section it has been customary to divide the casing and bore the half-cylindrical surfaces separately. When the parts so formed are assembled, the meeting edges of the half-cylinders very seldom exactly register with one another and it has therefore been difficult to secure a close seal between the pistons and the cylinder wall.

The invention which forms the subject matter of the present application resides in a method or process whereby the above mentioned objections are avoided. More particularly, it consists in a manipulative process wherein the sections of the casing are assembled on opposite sides of a rotatable tool, wherein the tool is caused to have relative movement in respect to the assembled casing and along the axis of the proposed cylinder, and wherein the sections are caused to approach one another from time to time. In this manner the curvature of the finished surface is made accurately continuous over and along the seam, and a proper seal may be readily secured between the piston or pistons and the cylinder wall.

For the purpose of illustrating one way in which the process may be carried out, I have shown and described herein the novel machine claimed in the above identified application for patent, but it will be apparent that in carrying out the objects of the invention, apparatus or means very different from that shown may be used.

Figure 1:
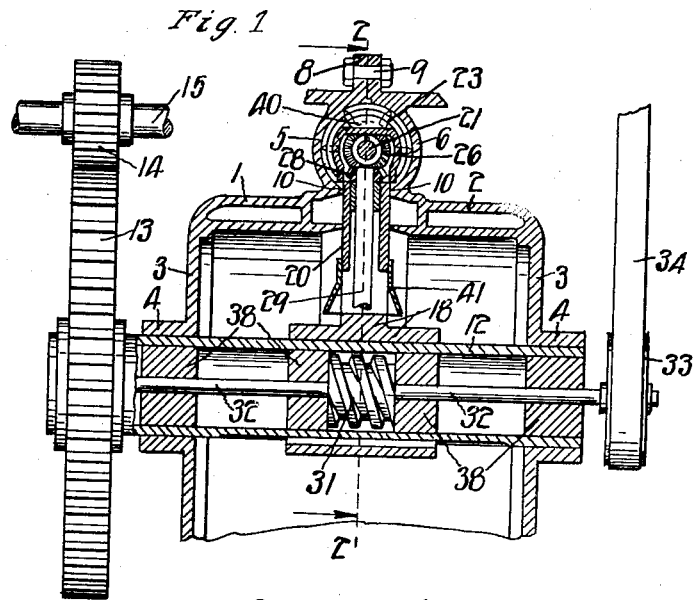
Figure 2:
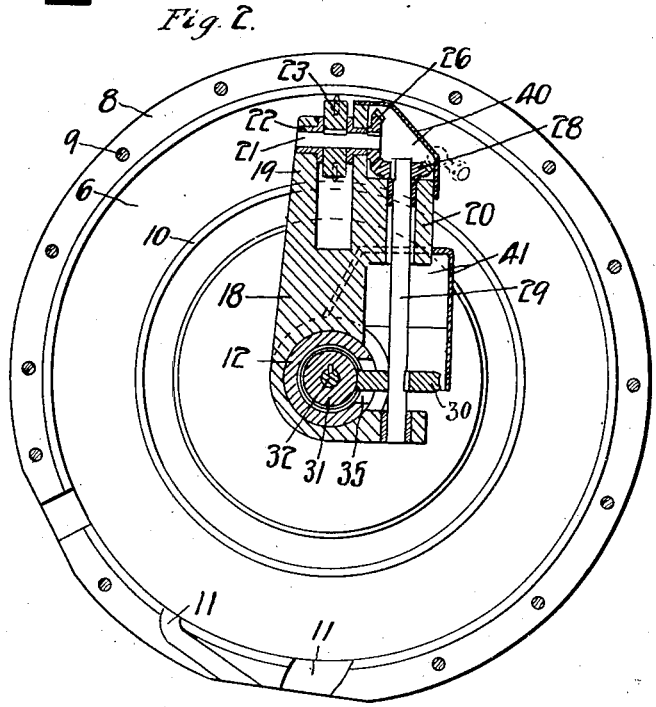

In the drawings, Figure 1 is a longitudinal section showing the relation of the work to the cutter. Fig. 2 is a section on the line 2—2 of Fig. 1.

1 and 2 designate the half sections of the casing the actual construction of which may vary widely. The end walls 3 of the sections are shown provided with alined annular flanges 4 (previously accurately finished) in which an engine shaft, not shown, is to be ultimately supported on suitable bearings. The sections of the casing are shaped roughly to form half annular cylinders 5 and 6 with perforated flanges 8 through which bolts 9 may be inserted to draw the sections toward each other. A space is left between the inner margins 10 of the cylindrical surfaces to receive the rotor or rotors, or the like. The casing is usually provided with one or more peripheral passages 11 leading to the cylinder, which, during the boring or grinding operation, are preferably arranged at the bottom to allow the cuttings or dust to drop out freely.

Mounted to rotate in the flanges 4 is a hollow shaft 12 which is slowly turned by any desired means, for example, by the gears 13 and 14 and the shaft 15. Rigidly secured on the central portion of the shaft 2 in any suitable way is a radial arm 18 having a divided end, the furcations 19 and 20 of which project through the slot between the faces 10 and support a shaft 21, a suitable bushing or bearing 22 being employed, if desired. This shaft carries a tool 23, which may be of any type suitable for boring, grinding or otherwise dressing or finishing the cylinder, the working surface of the tool being arranged in a plane that substantially includes the axis of the shaft 12.

Various means may be employed for driving the tool, that shown being the bevel gears 26 and 28, the shaft 29 (parallel to the plane of the rotating tool), the worm wheel 30, the worm 31 and worm shaft 32 that may be rapidly driven by the pulley 33 and belt 34. A portion of the wall of the hollow shaft is removed as indicated at 35, Fig. 2, to allow the worm wheel to mesh with the worm. Suitable bearings 38 are of course, provided for the worm shaft.

In order to exclude cuttings and dust from the gears 26 and 28, a detachable hood 40, which may be partly filled with lubricant, is provided; likewise a hood or shield 41 may be employed for deflecting the cuttings away from the worm and worm wheel.

In use, the gear 13 and the pulley 33 are removed, and the casing sections are slipped onto the ends of the shaft 12. The bolts 9 are inserted but are drawn up at first only far enough to cause the tool to take the roughing cut, and are thereafter gradually tightened, as will be readily understood. The tools are changed as required, the bolts being unscrewed for the purpose.

I claim:—

1. The process of forming a cylindrical surface, parts of which are located on two separate members, which consists in interposing between the members a tool rotatable about the axis of the surface, causing relative movement between the members and the tool along said axis, and causing the two members to approach the interposed tool.

2. The process of forming an annular cylindrical surface of 360° arc in length, the transverse cross-section of which is a circular arc greater than 180°, parts of the surface being located on two separate members which are adapted to meet one another in a plane substantially including the axis of the surface, which consists in positioning the two parts on opposite sides of a working tool, advancing the tool throughout the 360° arc forming the axis of the desired surface and rotating the tool about said axis, and gradually drawing the two members together.

3. The process of forming an annular cylindrical surface, parts of which are located on two separate members located on opposite sides of the plane that includes the circular axis of the proposed surface, which consists in forming in the two members alined bearing or guiding surfaces concentric about a line perpendicular to said plane at the center of the circular axis, and utilizing said guiding or bearing surfaces to support a tool positioned between said separate members and operable thereon to form the desired annular cylindrical surface.

HOWARD L. WEED.